United States Patent [19]

Blanchard et al.

[11] 4,426,319

[45] Jan. 17, 1984

[54] CATALYST FOR TREATMENT OF EXHAUST GASES FROM INTERNAL COMBUSTION ENGINES

[75] Inventors: Gilbert Blanchard, Le Plessis-Belleville; Jean-Pierre Brunelle, Saint-Brice sous Foret; Michel Prigent, Rueil Malmaison, all of France

[73] Assignee: Procatalyse, Rueil Malmason, France

[21] Appl. No.: 355,184

[22] Filed: Mar. 5, 1982

[30] Foreign Application Priority Data

Mar. 9, 1981 [FR] France ................................ 81 04596

[51] Int. Cl.³ .......................... B01J 23/10; B01J 23/62; B01J 23/89
[52] U.S. Cl. ................................. 502/241; 423/213.5; 502/261; 502/263; 502/304
[58] Field of Search ................... 252/455 R, 460, 462; 423/213.5

[56] References Cited

U.S. PATENT DOCUMENTS 4,283,308  8/1981  O'Hara et al. .................. 252/462 X
4,294,726 10/1981  Bozon et al. ........................ 252/462
4,378,307  3/1983  Brunelle et al. ................ 252/462 X

*Primary Examiner*—W. J. Shine
*Attorney, Agent, or Firm*—Burns, Doane, Swecker & Mathis

[57] ABSTRACT

The exhaust gases from internal combustion engines are catalytically oxidized/reduced, to remove CO, unburned hydrocarbons and $NO_x$ therefrom, utilizing an improved stable and long-lived catalyst which comprises (1) a support substrate, e.g., a monolithic or particulate support, and (2) an active phase deposited thereon, said active phase (2) comprising (i) cerium, (ii) iron, (iii) at least one of the metals gallium and/or yttrium, (iv) at least one of the metals platinum and/or palladium, and (v) at least one of the metals iridium and/or rhodium.

18 Claims, No Drawings

CATALYST FOR TREATMENT OF EXHAUST GASES FROM INTERNAL COMBUSTION ENGINES

BACKGROUND OF THE INVENTION

1. Field of the Invention

The present invention relates to certain three-way metal catalysts, and, more especially to such catalysts particularly adopted for the treatment of internal combustion engine exhaust gases.

Consistent herewith, by the expression "three-way catalysts" there are intended those catalysts which effect the oxidation, in particular, of the carbon monoxide and hydrocarbon emissions present in the exhaust gases of internal combustion engines, and also the simultaneous reduction, in particular, of the nitrogen oxide emissions also present in such gases.

2. Description of the Prior Art

In gasoline fueled internal combustion engines, it is conventional to adjust the composition of the exhaust gases to a certain stoichiometric equilibrium such that the catalytic oxidation and reduction of the various constituents thereof result in the formation of water, carbon dioxide and nitrogen. The means typically used for adjusting the composition of the exhaust gas to the desired degree of stoichiometry are, in particular, the continuous adjustment of the air/fuel ratio at the intake of the engine and/or the introduction of additional oxygen upstream of the catalyst.

In practice, this stoichiometric adjustment is never perfect and the composition of the exhaust gas in fact varies over periods of time on the order of one second for a composition containing a relative excess of oxidants (so-called "lean" adjustment) to a composition containing an excess of reducing agents (so-called "rich" adjustment), and vice versa.

In particular, the so-called "lean" adjustment is such that the amounts of oxygen and nitrogen oxide present are greater than those required to effect the oxidation of the carbon monoxide, the hydrocarbons and the hydrogen present. Conversely, and also in particular, the so-called "rich" adjustment is such that the amounts of carbon monoxide, hydrocarbons and hydrogen present are greater than those amounts required to effect the reduction of the oxygen and the nitrogen oxides present.

Catalysts for the treatment of exhaust gases of this type have of course already been proposed to this art. Thus, according to *Journal of Catalysis*, 56, 321 (1979) and the 6th North American Congress of the Catalysis Society-Chicago-March 1979-communication H$_4$, three-way catalysts are known which feature cerium oxide and precious metals as the active phase.

And according to published Japanese Application No. 3,062-777, three-way catalysts are also known which feature iron oxide and precious metals as the active phase.

Although, in certain cases, such prior art catalysts possess a sufficient initial activity to satisfy the antipollution standards adopted in countries such as the United States and Japan, these catalysts are characterized by the major disadvantage that they lose a large part of their three-way activity upon their prolonged use in a catalytic converter.

SUMMARY OF THE INVENTION

Accordingly, a major object of the present invention is the provision of an improved three-way catalyst comprising iron, cerium, gallium and/or yttrium and precious metals, which catalyst avoids those prior art disadvantages and drawbacks above outlined, and which catalyst, totally unexpectedly, has been demonstrated to have excellent activity and, in particular, is highly stable over prolonged periods of time, periods of stability far in excess of those associated with the prior art catalysts.

Briefly, the present invention features a three-way catalyst which comprises suitable support onto which an active phase is deposited, said active phase comprising cerium, iron, gallium and/or yttrium, at least one metal selected from the group comprising platinum and palladium, and at least one metal selected from the group comprising iridium and rhodium.

The support employed according to this invention is advantageously a refractory oxide and can comprise, for example, silica, alumina, silica-aluminates, or mixed oxides comprising, for example, alumina associated with silica, zirconium oxide, cerium oxide and/or titanium oxide.

DETAILED DESCRIPTION OF THE INVENTION

More particularly according to the present invention, in a preferred embodiment thereof, a support based on alumina particulates is utilized. This support preferably has a specific surface area ranging from 25 to 250 m$^2$/g and more preferably ranges from 70 to 150 m$^2$/g. It preferably has a total pore volume ranging from 0.5 to 2 cm$^3$/g and more preferably ranges from 0.8 to 1.7 cm$^3$/g. It preferably possesses a macroporosity such that the pore volume of the pores having a diameter of greater than 1,000 Å ranges from about 0.05 to 0.6 cm$^3$/g and more preferably ranges from 0.2 to 0.5 cm$^3$/g.

Supports of this type may have been prepared, in particular, from the active alumina obtained according to the process described in U.S. Pat. No. 2,915,365, and agglomerated according to the process described in U.S. Pat. No. 2,881,051.

Such supports may also be prepared by autoclaving the above agglomerates in a neutral or acid medium, followed by drying and calcination, in particular as described in French Pat. Nos. 1,449,904 and 1,386,364.

The supports used may also be prepared according to the process described in French Patent Application No. 77/23,880, published under No. 2,399,276.

The alumina supports too may be prepared according to the process described in published European Patent Application No. 15,801.

Typically, the supports based on alumina particles employed consistent herewith, may be treated, as is well-known to those skilled in this art, with pore-forming agents, such as those based on cellulose, naphthalene, natural gums, synthetic polymers, or the like, in order to provide them with the desired porosity properties.

The support utilized according to the invention can also consist of one or more refractory oxides, preferably employed in the form of a film or coating applied to a metal monolith, or a monolith of ceramic material, said monolith preferably being in the form of an inert and rigid honeycomb structure comprising channels or ducts. Supports or this type are well known to this art and have been widely described in the literature.

Exemplary of such refractory oxides are: the oxides of aluminum, magnesium, calcium, strontium, barium, scandium, lanthanides, indium, thallium, silicon, titanium, zirconium, hafnium, thorium, germanium, tin, lead, vanadium, niobium, tantalum, chromium, molybdenum, tungsten and rhenium. It is preferred to use a coating of aluminum oxide.

Representative metal monoliths utilized per this invention are those obtained from alloys of chromium, aluminum and cobalt, such as those marketed under the trademark KANTHAL, or those obtained from alloys of iron, chromium, aluminum and yttrium and marketed under the trademark FECRALLOY. The metal can also be carbon steel or simple cast iron.

These metal substrates can be coated with aluminum oxide by heating the aluminum-based alloys in an oxygen atmosphere, under conditions of time and temperature which enable the formation of a surface layer of aluminum oxide from the aluminum contained in the alloy, and active alumina is then deposited onto this layer. In the case of carbon steels or cast iron, a coating of an aluminum/iron diffusion layer can be obtained by heating iron or steel covered with aluminum, for at least 1 minute at 600°-1,200° C., and a layer of active alumina is deposited onto this diffusion layer.

Exemplary monoliths of ceramic material are those comprising, as the main ingredient: cordierite, alumina, mullite, zirconium, zirconium mullite, barium titanate, porcelain, thorium oxide, magnesium oxide, steatite, the carbides of boron or silicon, or the monolithic refractory support.

By way of example, these ceramic monoliths can be coated with aluminum oxide by applying thereto alumina hydrate, followed by calcination, or by the deposition thereon of an aluminum salt, followed by calcination, or by applying thereto a layer of active alumina, also followed by calcination.

The cellular honeycomb structure can have a hexagonal, tetragonal, triangular or corrugated shape and it must allow gas to pass through the channels or ducts formed during its manufacture, whether by extrusion, rolling, solidification of elements in sheet form, or the like.

Furthermore, the supports used according to the invention are advantageously treated such as to impart to same a good heat stability upon passage of time. These treatments, which are also well known to this art, consist, in particular, of stabilizing the alumina particulates or the coating of aluminum oxide by means of alkaline earth metals, silicon and/or rare earths.

The stabilized supports described in French Pat. Nos. 2,257,335 and 2,290,950 are quite suitable for the purposes of this invention.

The proportion, in the catalysts, of the platinum and/or palladium metal advantageously ranges from about 0.04 to 0.5% by weight, relative to the weight of the support, and preferably ranges from about 0.05 and 0.15% by weight. The proportion of the iridium and/or rhodium metal advantageously varies from about 0.002 to 0.1% by weight and preferably from about 0.005 to 0.02% by weight. Preferably, the ratio of the weight of platinum and/or palladium to the weight of iridium and/or rhodium ranges from about 4 to about 40 and more preferably from 7 to 20.

In accordance with one preferred embodiment of the catalysts according to the invention, it is preferred to use rhodium associated with platinum and/or palladium.

The total proportion of cerium and iron in the catalysts according to the invention ranges from about 0.1 to about 10% by weight, relative to the support. Such proportion preferably ranges from 0.3 to 6.5%.

The proportion of gallium in the catalysts according to the invention ranges from about 0.01 to about 10% by weight, relative to the support. This proportion preferably ranges from 0.01 to 2.0% and more preferably ranges from 0.02 to 0.5%.

The proportion of yttrium in the catalysts according to the invention ranges from about 0.01 to about 10% by weight, relative to the support. This proportion preferably ranges from 0.01 to 2% and more particularly ranges from 0.02 to 0.5%.

According to another embodiment of the invention, the catalysts can also comprise at least one of the following metals: tungsten, copper, manganese, tin, germanium, tantalum, uranium and niobium. The total proportion of these metals by weight, relative to the support, ranges from about 0.1 to 5%.

The catalysts according to the invention are advantageously prepared consistent with techniques common to this art, either by impregnating the support or by applying the metals constituting the active phase during the manufacture of the support.

Same are preferably prepared by impregnating the support with solutions of inorganic or organic compounds of the metals desired to be introduced. Such impregnation can be carried out with solutions common to the metals, or successively with different solutions.

According to another preferred embodiment hereof, the support is successively impregnated with a solution containing compounds of iron, cerium and gallium and/or yttrium, and then with one or more solutions containing compounds of the precious metals desired to be incorporated.

Exemplary compounds of iron, cerium, gallium and yttrium which can be used, particularly representative are the salts of iron, cerium, gallium and yttrium, and more particularly ferric nitrate, ammoniacal iron citrate, ferric chloride and cerous nitrate, cerous acetate, cerous chloride and ammoniacal ceric nitrate, gallium nitrate, gallium trichloride, gallium acetylacetonate, yttrium nitrate and gallium trichloride monohydrate.

And representative such compounds of rhodium, platinum and palladium are hydrated rhodium trichloride, chloroplatinic acid, palladium chloride, palladium nitrate and also chloropentamminerhodium (III) dichloride, tetramminepalladium (III) dichloride and tetramminepalladium(II) dichloride.

When using a support based on refractory oxide, and in particular on aluminum oxide, the depth of impregnation can advantageously be adjusted by using those techniques known to this art for such purpose, and in particular by adding a certain amount of mineral or organic acid to the solution of the precious metals. Nitric, hydrochloric and hydrofluoric acids, or acetic, citric and oxalic acids are commonly used thusly.

After impregnation of the support, the catalyst is dried and then activated in a stream of air at a temperature ranging from about 300° to 800° C. for a few hours.

The activation of the catalysts is advantageously carried out in a reducing atmosphere at a temperature ranging from about 200° to 700° C.; it is possible, for example, to use hydrogen, carbon monoxide and/or hydrogen sulfide as reducing agents.

When using a support consisting, in particular, of a coating of alumina deposited on a metal substrate or a substrate of ceramic material, impregnation is advantageously carried out by bringing the substrate into contact with an aqueous dispersion of an alumina precursor, which contains dissolved salts or oxides of iron, cerium and gallium and/or yttrium, with the catalysts next being dried and then calcined at about 500°–700° C.; these operations are repeated, as necessary, and the precious metals are then introduced and the process is then completed in the manner explained above in the case of the supports based on refractory oxide.

It has been found that the catalyst according to the invention enables one to very efficiently remove the major portion of the carbon monoxide, of the unburned hydrocarbons and also of the nitrogen oxides present in the exhaust gases of internal combustion engines, and that, furthermore, they possess a remarkable stability over prolonged periods of time.

In order to further illustrate the present invention and the advantages thereof, the following specific examples are given, it being understood that same are intended only as illustrative and in nowise limitative.

EXAMPLE 1

Preparation of Prior Art Catalyst (A)

100 g of beads of active alumina, having a specific surface area of 250 m$^2$/g and a total pore volume of 0.55 cm$^3$/g, were impregnated with 55 cm$^3$ of a solution of cerium nitrate, containing 5.0 g of cerium.

After a contact time of 30 minutes, the beads were dried at 150° C. and then calcined in air at 400° C. for 3 hours. Same were then impregnated with 55 cm$^3$ of a solution of chloroplatinic acid and hydrated rhodium trichloride, containing 73 mg of platinum and 7.3 mg of rhodium. After a contact time of 30 minutes, the beads were dried at 150° C. and then activated at 400° C. for 3 hours in a stream of hydrogen circulating at a rate of 200 liters per hour.

The catalyst (A) prepared in this fashion contained 0.073% of platinum, 0.0073% of rhodium and 5% of cerium, all by weight relative to the support.

EXAMPLE 2

Preparation of Prior Art Catalyst (B)

100 g of beads of active alumina, having the same textural characteristics as those described in the previous example, were impregnated with 55 cm$^3$ of a solution of ferric nitrate, containing 5.0 g of iron.

Afer a contact time of 30 minutes, the beads were dried at 150° C. and then calcined in air at 400° C. for 3 hours. Same were then impregnated with 55 cm$^3$ of a solution of chloroplatinic acid and hydrated rhodium trichloride, containing 73 mg of platinum and 7.3 mg of rhodium. After a contact time of 30 minutes, the beads were dried at 150° C. and then activated at 400° C. for 3 hours in a stream of hydrogen circulating at a rate of 200 liters per hour.

The catalyst (B) prepared in this fashion contained 0.073% of platinum, 0.0073% of rhodium and 5% of iron, all by weight relative to the support.

EXAMPLE 3

Preparation of Catalyst (C) According to the Invention 100 g of beads of alumina, gamma in structure, were prepared according to the processes described in French Pat. Nos. 1,449,904 and 1,386,364, by autoclaving agglomerates of active alumina in the presence of acid, then by drying and calcination.

The alumina beads obtained had a specific surface area of 100 m$^2$/g, a total pore volume of 0.90 cm$^3$/g and a volume of 0.40 cm$^3$/g consisting of micropores having a diameter of greater than 1,000 Å.

These beads were impregnated with 90 cm$^3$ of an aqueous solution of ferric nitrate, cerous nitrate and gallium nitrate, containing 2.0 g of iron, 4.0 g of cerium and 0.08 g of gallium.

After a contact time of 30 minutes, the beads were dried at 150° C. and then calcined in air at 400° C. for 3 hours.

Same were then impregnated with 90 cm$^3$ of a solution of chloroplatinic acid and hydrated rhodium trichloride, containing 73 mg of platinum and 7.3 mg of rhodium.

After a contact time of 30 minutes, the beads were dried at 150° C. and then activated at 400° C. for 3 hours in a stream of hydrogen circulating at a rate of 200 liters per hour.

The catalyst (C) prepared in this fashion contained 0.073% of platinum, 0.0073% of rhodium, 2.0% of iron, 4.0% of cerium and 0.08% of gallium, all by weight relative to the support.

EXAMPLE 4

Preparation of Catalyst (D) According to the Invention 100 g of alumina beads were prepared according to the process described in French Patent Application No. 79/04,810.

These beads had a specific surface area of 100 m$^2$/g, a total pore volume of 1.20 cm$^3$/g and a volume of 0.45 cm$^3$/g consisting of macropores having a diameter greater than 1,000 Å.

The procedure used for impregnation was similar to that described in the foregoing Example 3. In this example 120 cm$^3$ of an aqueous solution of ferric nitrate, cerous nitrate and gallium nitrate, containing 1.5 g of iron, 3.0 g of cerium and 0.2 of gallium, and then 120 cm$^3$ of a solution of chloroplatinic acid and hydrated rhodium trichloride, containing 73 mg of platinum and 7.3 mg of rhodium, were utilized.

The catalyst (D) prepared in this fashion contained 0.073% of platinum, 0.0073% of rhodium, 1.5% of iron, 3% of cerium and 0.2% of gallium, all by weight relative to the support.

EXAMPLE 5

Preparation of Catalyst (E) According to the Invention

A suspension of alumina in water was prepared, which was suitable for coating a metal monolithic structure marketed under the trademark Fecralloy.

The 100 g monolith was immersed in the suspension, of pH=3.5, containing 30% by weight of alumina. The aforesaid support was drained and dried such that its channels were emptied, and same was then calcined at 600° C. for 3 hours. The monolith coated in this manner was immersed in an aqueous solution of ferric nitrate, cerous nitrate and gallium nitrate for 30 minutes, and it was then drained and dried at 150° C. and calcined at 400° C. for 3 hours. The concentrations of ferric nitrate, cerous nitrate and gallium nitrate in the solution were such that, after immersion and calcination, the monolith contained 0.8% by weight of iron, 4% by weight of cerium and 0.2% by weight of gallium.

The substrate was then impregnated by soaking it in an aqueous solution of chloroplatinic acid and hydrated rhodium trichloride.

The concentrations of chloroplatinic acid and hydrated rhodium trichloride were such that the 100 g monolith was impregnated with 73 mg of platinum and 7.3 mg of rhodium. After a contact time of 30 minutes, the monolith was drained and dried at 150° C. and then activated at 400° C. for 3 hours in a stream of hydrogen circulating at a rate of 200 liters per hour.

The catalyst (E) prepared in this fashion contained 0.073% of platinum, 0.0073% of rhodium, 0.8% of iron, 4% of cerium and 0.2% of gallium, all by weight relative to the support.

EXAMPLE 6

Preparation of Catalyst (F) According to the Invention 100 g of beads of alumina, gamma in structure, were prepared according to the processes described in French Patents Nos. 1,449,904 and 1,386,364, by autoclaving agglomerates of active alumina in the presence of acid, and then drying and calcination.

The alumina beads had a specific surface area of 100 m$^2$/g, a total pore volume of 0.90 cm$^3$/g and a volume of 0.40 cm$^3$/g consisting of macropores having a diameter greater than 1,000 Å.

These beads were impregnated with 90 cm$^3$ of an aqueous solution of ferric nitrate, cerous nitrate and yttrium nitrate, containing 1.5 g of iron, 4.9 g of cerium and 0.2 g of yttrium.

After a contact time of 30 minutes, the beads were dried at 150° C. and then calcined in air at 400° C. for 3 hours.

Same were then impregnated with 90 cm$^3$ of a solution of chloroplatinic acid and hydrated rhodium trichloride, containing 73 mg of platinum and 7.3 mg of rhodium.

After a contact time of 30 minutes, the beads are dried at 150° C. and then activated at 400° C. for 3 hours in a stream of hydrogen circulating at a rate of 200 liters per hour.

The catalyst (F) prepared in this fashion contained 0.073% of platinum, 0.0073% of rhodium, 1.5% of iron, 4.0% of cerium and 0.2% of yttrium, all by weight relative to the support.

EXAMPLE 7

Preparation of Catalyst (G) According to the Invention 100 g of alumina beads were prepared according to the process described in French Patent Application No. 79/04,810.

These beads had a specific surface area of 100 m$^2$g, a total pore volume of 1.20 cm$^3$/g and a volume of 0.45 cm$^3$/g consisting of macropores having a diameter of greater than 1,000 Å.

The procedure used for impregnation was similar to that described in Example 6; but in this instance, 120 cm$^3$ of an aqueous solution of ferric nitrate, cerous nitrate and yttrium nitrate, containing 2 g of iron, 4.0 g of cerium and 0.08 g of yttrium, and then 120 cm$^3$ of a solution of chloroplatinic acid and hydrated rhodium trichloride, containing 73 mg of platinum and 7.3 mg of rhodium, were employed.

The catalyst (G) prepared in this fashion contained 0.073% of platinum, 0.0073% of rhodium, 2% of iron, 4% of cerium, and 0.8% of yttrium, all by weight relative to the support.

EXAMPLE 8

Preparation of Catalyst (H) According to the Invention

A suspension of alumina in water was prepared, which was suitable for coating a ceramic monolithic honeycomb structure.

The procedure used for impregnation was similar to that described in Example 5. In this instance, an aqueous solution of ferric nitrate, cerous nitrate and yttrium nitrate was employed, the concentrations of which were such that, after immersion and calcination, the monolith contained 0.8% by weight of iron, 3% by weight of cerium and 0.2% by weight of yttrium. The substrate was then impregnated by soaking it in an aqueous solution of chloroplatinic acid and hydrated rhodium trichloride.

The catalyst (H) prepared in this fashion contained 0.073% of platinum, 0.0073% of rhodium, 0.8% of iron, 3% of cerium and 0.2% of yttrium, all by weight relative to the support.

EXAMPLE 9

Preparation of Catalyst (I) According to the Invention 100 g of beads of alumina, gamma in structure, were prepared according to the processes described in French Patents Nos. 1,449,904 and 1,386,364, by autoclaving agglomerates of active alumina in the presence of acid, then by drying and calcination.

The procedure used for impregnation was similar to that described in Example 3. In this instance, 90 cm$^3$ of an aqueous solution of ferric nitrate, cerous nitrate, yttrium nitrate and gallium nitrate, containing 1 g of iron, 3.0 g of cerium, 1.0 g of yttrium and 0.2 of gallium, and then 90 cm$^3$ of a solution of chloroplatinic acid and hydrated rhodium trichloride, containing 73 mg of platinum and 7.3 mg of rhodium, were employed.

The catalyst (I) prepared in this fashion contained 0.073% of platinum, 0.0073% of rhodium, 1% of iron, 3.0% of cerium, 1.0% of yttrium and 0.2% of gallium, all by weight relative to the support.

EXAMPLE 10

Preparation of Catalyst (J) According to the Invention

A suspension of alumina in water was prepared, which was suitable for coating a ceramic monolithic honeycomb structure.

The procedure used for impregnation was similar to that described in Example 5. In this instance, an aqueous solution of ferric nitrate, cerous nitrate, gallium nitrate and yttrium nitrate was employed, the concentration of which was such that, after immersion and calcination, the monolith contained 0.8% by weight of iron, 4% by weight of cerium, 0.15% by weight of gallium and 0.15% by weight of yttrium. The substrate was then impregnated by soaking it in aqueous solution of chloroplatinic acid and hydrated rhodium trichloride.

The catalyst (J) prepared in this fashion contained 0.073% of platinum, 0.0073% of rhodium, 0.8% of iron, 4% of cerium, 0.15% of gallium and 0.15% of yttrium, all by weight relative to the support.

EXAMPLE 11

Preparation of Catalyst (K) According to the Invention 100 g of alumina beads such as described in Example 3 were impregnated with 90 cm³ of an aqueous solution of ferric nitrate, containing 1.0 g of iron, 4 g of cerium, 0.2 g of yttrium and 1 g of manganese.

After a contact time of 30 minutes, the beads were dried at 150° C. and then calcined in air at 400° C. for 3 hours. Same were then impregnated with 90 cm³ of a solution of chloroplatinic acid, palladium chloride and hydrated rhodium trichloride, containing 73 mg of platinum, 29.2 mg of palladium and 7.3 mg of rhodium.

After a contact time of 30 minutes, the beads were dried at 150° C. and then activated at 400° C. for 3 hours in a stream of hydrogen circulating at a rate of 200 liters per hour.

The catalyst (K) prepared in this fashion contained 0.073% of platinum, 0.0292% of palladium, 0.0073% of rhodium, 1.0% of iron, 4% of cerium, 0.2% of yttrium and 1% manganese, all by weight relative to the support.

EXAMPLE 12

Preparation of Catalyst (L) According to the Invention 100 g of alumina beads such as described in Example 4 were impregnated with 120 cm³ of an aqueous solution of ferric nitrate, cerous nitrate, gallium nitrate and metatungstic acid, containing 1.5 g of iron, 3.5 g of cerium, 0.2 g of gallium and 1 g of tungsten.

After a contact time of 30 minutes, the beads were dried at 150° C. and then calcined in air at 400° C. for 3 hours. Same were then impregnated with 120 cm³ of a solution of chloroplatinic acid, palladium chloride and hydrated rhodium trichloride, containing 73 mg of platinum, 29.2 mg of palladium and 7.3 mg of rhodium.

After a contact time of 30 minutes, the beads were dried at 150° C. and then activated at 400° C. for 3 hours in a stream of hydrogen circulating at a rate of 200 liters per hour.

The catalyst (L) prepared in this fashion contained 0.073% of platinum, 0.0292% of palladium, 0.0073% of rhodium, 1.5% of iron, 3.5% of cerium, 0.2% of gallium and 1% of tungsten, all by weight relative to the support.

EXAMPLE 13

Activities of the Various Catalysts, Tested on an Automobile According to American CVS-CH cycle This example reports the test results obtained on an automobile, according to American CVS-CH cycle, and when utilizing the various catalysts (A), (B), (C), (D), (E), (F), (G), (H), (I), (J), (K) and (L) heretofore respectively described in Examples 1 to 12.

The conditions of this test were those specified in the following reference: "*Federal Register,* volume 42, No. 124- June 28th, 1977, pages 32,906 to 33,004, Title 40: Protection of Environment, chapter 1, Environmental Protection Agency, part 86: Control of air pollution from new motor vehicles and new motor vehicle engines".

The motor vehicle used was a RENAULT R 17 TS equipped with a BOSCH-L JETRONIC prototype electronic injection device regulated by means of oxygen sensor. The inertia of the vehicle was 2,750 lbs (1,250 kg). The adjustment of the hydraulic brakes simulating road resistance, made according to the American Federal Standard, corresponded, on the chassis dynamometer used, to a traction force at equilibrium of 25 kg f at 80 km/hour.

The base emissions of the vehicle, without a catalytic converter, were as follows:

(i) CO: 12.3 g/mile
(ii) HC: 1.8 g/mile
(iii) $NO_x$: 2.4 g/mile

An experimental catalyst converter of the cylindrical type with radial circulation, having a volume of 1,700 cm³, was adapted to the exhaust manifold at a distance of about 1.7 m from the engine.

The Table below reports the various results obtained with the various catalysts (A), (B), (C), (D), (E), (F), (G), (H), (I), (J), (K) and (L) respectively described in Examples 1 to 12.

Table: Emissions of carbon monoxide (CO), hydrocarbons (HC) and nitrogen oxides ($NO_x$), measured on a car according to the American CVS-CH cycle and expressed in grams per mile.

TABLE

|  | Example No. | Catalyst designation | Emissions after aging of the catalyst on an engine test-bed for 600 hours at 600° C. | | |
|---|---|---|---|---|---|
|  |  |  | CO | HC | $NO_x$ |
| PRIOR ART | 1 | (A) | 6.60 | 0.77 | 1.12 |
|  | 2 | (B) | 8.40 | 1.35 | 1.88 |
| INVENTION | 3 | (C) | 4.06 | 0.52 | 0.48 |
|  | 4 | (D) | 3.04 | 0.40 | 0.40 |
|  | 5 | (E) | 5.02 | 0.55 | 0.65 |
|  | 6 | (F) | 3.27 | 0.43 | 0.45 |
|  | 7 | (G) | 4.47 | 0.52 | 0.53 |
|  | 8 | (H) | 5.25 | 0.59 | 0.64 |
|  | 9 | (I) | 2.95 | 0.38 | 0.41 |
|  | 10 | (J) | 4.87 | 0.52 | 0.60 |
|  | 11 | (K) | 3.74 | 0.46 | 0.40 |
|  | 12 | (L) | 2.91 | 0.36 | 0.37 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed:

1. A stable, long-lived catalyst which comprises (1) a support substrate and (2) an active phase deposited thereon, said active phase (2) comprising (i) cerium, (ii) iron, (iii) at least one of the metals of gallium and/or yttrium, (iv) at least one of the metals platinum and/or palladium, and (v) at least one of the metals iridium and/or rhodium.

2. The catalyst as defined in claim 1, said support substrate (1) comprising a refractory oxide.

3. The catalyst as defined in claim 1, said support substrate (1) comprising silica/alumina, zirconium oxide, cerium oxide, titanium oxide, or combination thereof.

4. The catalyst as defined by claim 1, said support substrate (1) comprising porous alumina particulates.

5. The catalyst as defined by claim 4, said alumina particulates having a specific surface area ranging from about 25 to 250 m²/g, a total pore volume ranging from about 0.5 to 2 cm³/g, and a macroporosity such that the pore volume of those pores having a diameter of greater than 1,000 Å ranges from about 0.05 to 0.6 cm³/g.

6. The catalyst as defined by claim 5, said alumina particulates having a specific surface area ranging from about 70 to 150 m$^2$/g, a total pore volume ranging from about 0.8 to 1.7 cm$^3$/g, and a macroporosity such that the pore volume of those pores having a diameter of greater than 1,000 Å ranges from 0.2 to 0.5 cm$^2$/g.

7. The catalyst as defined by claims 2 or 3, said support substrate (1) comprising a film or coating of refractory oxide applied to a metal or ceramic monolith.

8. The catalyst as defined by claim 7, said monolith comprising an open-called, inert and rigid honeycomb shaped article.

9. The catalyst as defined by claim 1, said support substrate (1) comprising a film or coating of alumina oxide applied to a metal or ceramic monolith.

10. The catalyst as defined by claim 9, said monolith comprising an open-celled, inert and rigid honeycomb shaped article.

11. The catalyst as defined by claims 4 or 9, said alumina particulates or aluminum oxide coating having been stabilized with alkaline earth metal, silicon, rare earth, or combination thereof.

12. The catalyst as defined by claim 1, said active phase (2) comprising from about 0.04 to about 0.5% by weight, based upon the weight of the support substrate (1), of the at least one platinum and/or palladium metal (iv); from about 0.002 to about 0.1% by weight, again based upon the support substrate weight, of the at least one iridium and/or rhodium metal (v); from about 0.1 to about 10% by weight, also based upon the support substrate weight; of the total amount of cerium (i) and iron (ii); and from about 0.01 to about 10% by weight, also based upon the support substrate weight, of the at least one gallium and/or yttrium metal.

13. The catalyst as defined by claim 12, said active phase (2) comprising from about 0.05 to 0.15% by weight of the at least one platinum and/or palladium metal (iv); from about 0.005 to about 0.02% by weight of the at least one iridium and/or rhodium metal (v); and from about 0.01 to about 2.0% by weight of the at least one gallium and/or yttrium metal.

14. The catalyst as defined by claim 1, said active phase (2) further comprising (vi) at least one of the metals, tungsten, copper, manganese, tin, germanium, tantalum, uranium and/or niobium, in an amount ranging from about 0.1 to about 5% by weight, based upon the weight of the support substrate (1).

15. The catalyst as defined by claim 12, wherein said active phase (2) the ratio of the weight of the platinum and/or palladium to the weight of the iridium and/or rhodium ranging from about 4 to about 40.

16. The catalyst as defined by claim 15, said ratio ranging from about 7 to about 20.

17. The catalyst as defined by claim 12, said active phase (2) comprising rhodium and platinum and/or palladium.

18. The catalyst as defined by claim 2, said refractory oxide comprising silica, alumina, silica-aluminate or a combination thereof.

* * * * *